United States Patent [19]

Kane

[11] Patent Number: 4,829,532
[45] Date of Patent: May 9, 1989

[54] PIEZO-ELECTRICALLY TUNED OPTICAL RESONATOR AND LASER USING SAME

[75] Inventor: Thomas J. Kane, Palo Alto, Calif.

[73] Assignee: Lightwave Electronics Corporation, Mountain View, Calif.

[21] Appl. No.: 185,467

[22] Filed: Apr. 25, 1988

[51] Int. Cl.[4] ............................................. H01S 3/10
[52] U.S. Cl. ...................................... 372/20; 372/37; 372/66; 372/93
[58] Field of Search ...................... 372/94, 37, 93, 66, 372/92, 71, 20, 66; 356/350

[56] References Cited

U.S. PATENT DOCUMENTS 4,578,793 3/1986 Kane ...................................... 372/94
4,747,111 5/1988 Trutna, Jr. et al. ................... 372/94

Primary Examiner—Léon Scott, Jr.
Attorney, Agent, or Firm—Rosenblum, Parish & Bacigalupi

[57] ABSTRACT

An optical resonator, preferably of a solid state laser, is tuned by one or more sheets of piezo-electric material bonded to one or more tuning facets of an optically transparent solid state member portion of the resonator. A tuning voltage applied across the piezo-electric sheet tends to change the area of the bonded interface of the sheet to generate a set of tuning forces predominantly in the plane of the surface of the tuning facet. These tuning forces are transmitted through the tuning facet into the solid state portion of the optical resonator to produce a change in its refractive index and dimensional change which tunes the frequency of the optical resonator and the laser using same, if any. In a preferred embodiment, the piezo-electrically tuned optical resonator is an optically pumped ring resonator made of a lasant material such as Nd:YAG for tuning the output frequency of the ring laser.

13 Claims, 2 Drawing Sheets

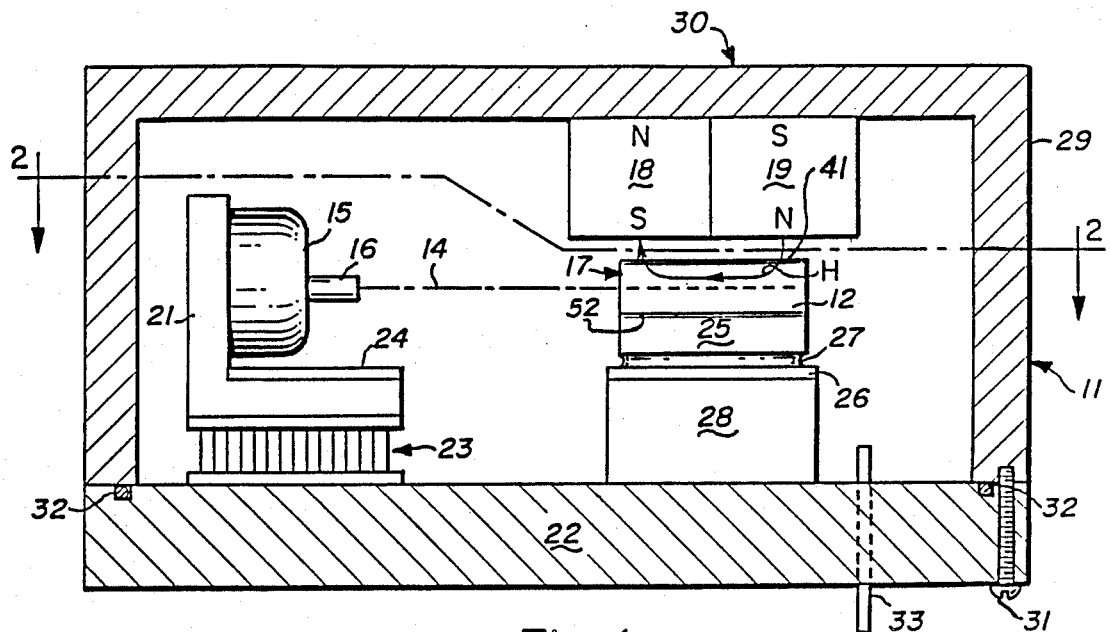
Fig_1
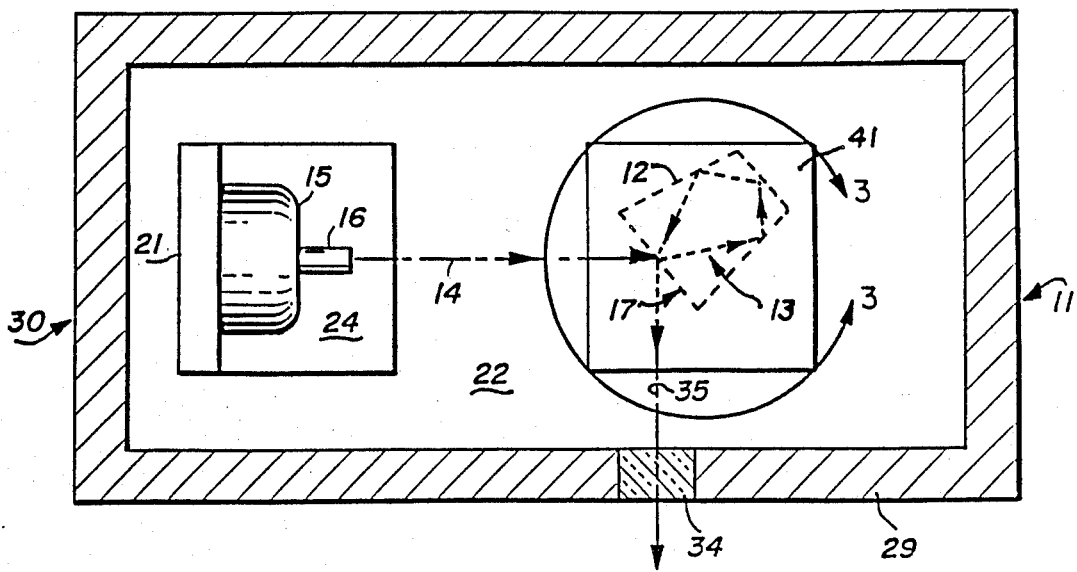
Fig_2

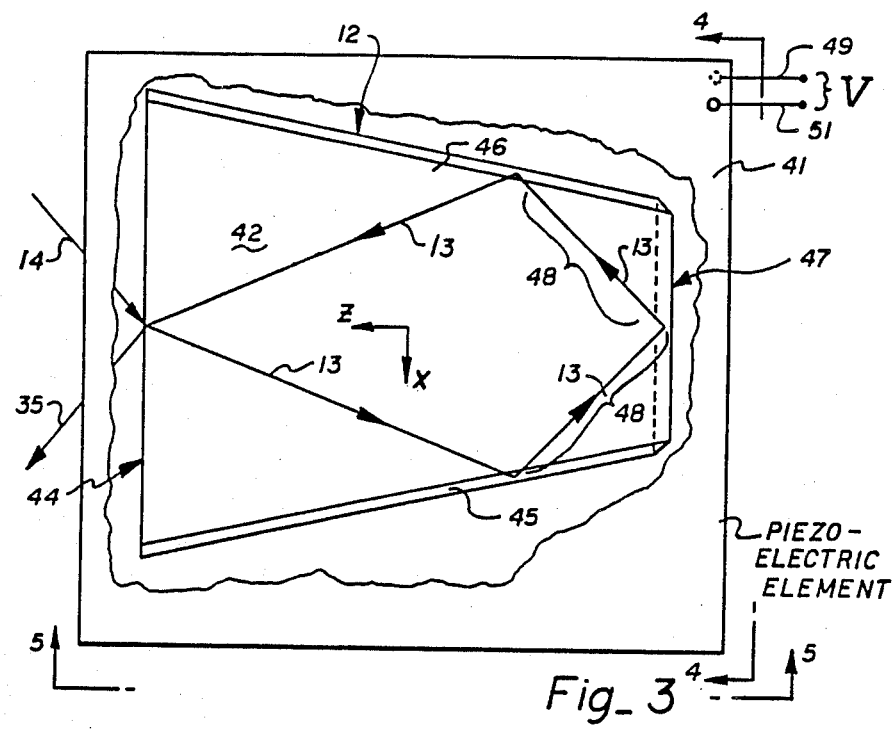
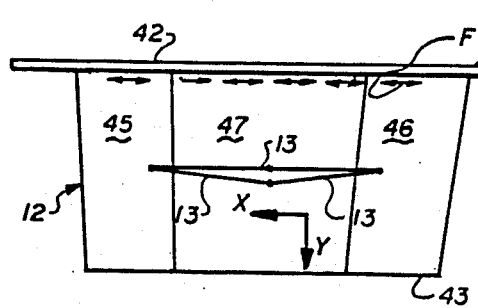
Fig_4
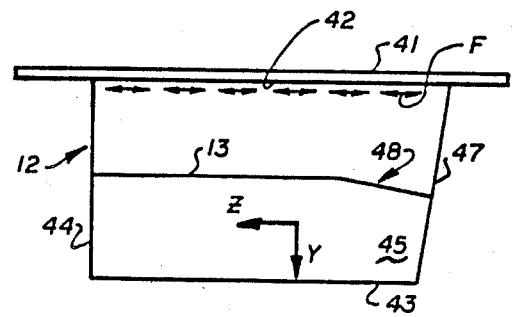
Fig_5
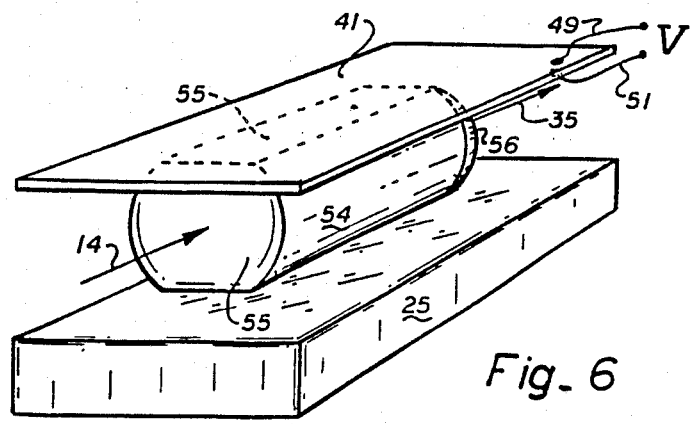
Fig_6

PIEZO-ELECTRICALLY TUNED OPTICAL RESONATOR AND LASER USING SAME

BACKGROUND OF THE INVENTION

The present invention relates in general to an improved piezo-electrically tuned optical resonator, and more particularly, to a piezo-electrically tuned ring laser.

Laser-diode pumped monolithic lasers have permitted the construction of frequency stable, single-mode lasers. Single-mode frequency-stable lasers have many applications in coherent communications, laser radar, and in the creation of visible light through harmonic conversion. For all these applications, the ability to quickly tune the oscillating frequency of the laser is of great value.

The tuning of a laser requires that the optical length of the laser resonant cavity be changed. For non-monolithic lasers, a common technique is to use a piezo-electric element to translate one of the mirrors which define the resonant cavity of the laser. This technique is not possible with a monolithic laser. A monolithic laser is defined as having a resonant cavity consisting of a single element, which is made of the active laser material. The resonator mirrors are formed on surfaces of the single element. Thus the mirrors, not being separate elements, cannot be translated in the usual way. Some other technique is needed to change the optical length of the resonant cavity.

In the past, thermal tuning was used for frequency tuning. The thermal expansion of the monolithic element, combined with a thermally-induced change in the index of refraction, lead to the change in the optical length of the resonator required for frequency tuning. Thermal tuning is necessarily quite slow, as thermal time constants of even small objects tend to be on the order of one second. Much faster tuning, with response times less than 1 millisecond, are desired.

It is known that the indicesof refraction of materials change when a stress is applied. It is also known that even the most rigid materials expand or contract when a stress is applied. Stress can be applied to a solid element very quickly, with the only fundamental physical limit being the speed of sound in the material. Application of stress to monolithic lasers thus is a way to quickly change the index and the dimensions and thus the optical length, thus inducing a tuning of the resonant frequency.

Heretofore, stress tuning of a monolithic rod laser has been achieved. In this prior art stress-tuned laser, a monolithic rod of lasant material is held in a clamp structure to apply a substantial bias force and thus stress to the laser rod. A portion of the clamp structure includes a stack of piezo-electric elements. A voltage is applied to the piezo-electric elements to modulate the bias force applied to the monolithic rod laser to tune the laser over a substantial tuning range as of 90 GHz. Such a stress-tuned diode laser is disclosed in an article appearing in Vol. 12, No. 12, of "Optics Letters", pgs. 999-1001 of December 1987.

Problems associated with the prior art stress-tuned laser include the fact that the clamp structure is relatively large. The large size of the tuning structure has two disadvantages. First, the response time of the system is slowed. Second, large size makes the entire laser more sensitive to acoustic noise, reducing the frequency stability of the laser.

It would be desired to obtain a piezo-electrically tuned monolithic laser having decreased response time and improved frequency stability at the cost of tuning over a lower tuning range.

SUMMARY OF THE PRESENT INVENTION

The principal object of the present invention is the provision of an improved piezo-electrically tuned optical resonator and lasers using same.

In one feature of the present invention, solid state optically transparent member of an optical resonator includes a tuning facet and a thin piezo-electric member bonded in force-exchanging relation with the tuning facet for transmitting a vector force directed generally parallel to the surface of the facet into the optically transparent member through the tuning facet for producing a stress-related change in the index of refraction of the optically transparent member for tuning the frequency of the optical resonator, whereby the size and mass of the piezo-electric tuning structure is substantially decreased for increasing the tuning rate and for decreasing the sensitivity of the resultant optical resonator to acoustic noise while facilitating manufacture of the tuned resonator.

In another feature of the present invention, a piezo-electrically tuned member of the optical resonator is faceted with the facets disposed and arranged for reflecting optical wave energy therebetween and around in an enclosed path to define a monolithic optical ring resonator.

In another feature of the present invention, a piezo-electrically tuned optically transparent faceted member is made of a laser gain material and optically pumped to define piezo-electrically tuned monolithic laser.

In another feature of the present invention, the piezo-electrically tuned optically transparent member of the optical resonator is made of a magneto-optic material and a magnet is provided for applying a magnetic field to the piezo-electrically tuned member for producing a Faraday rotation effect therein to preferentially attenuate resonated lasant optical radiation travelling in a direction counter to the output optical energy within said optical resonator.

Other features and advantages of the present invention will become apparent upon a perusal of the following specification taken in connection with the accompanying drawings wherein:

BRIEF DESCRIPTION OF THE DRAWINGS

FIG. 1 is a longitudinal sectional view of a laser oscillator of the present invention, FIG. 2 is a sectional view of the structure of FIG. 1 taken along line 2—2 in the direction of the arrows, FIG. 3 is an enlarged, plan view of the optical resonator portion of the structure of FIG. 2 delineated by line 3—3, FIG. 4 is an end view of the structure of FIG. 3 taken along line 4—4 in the direction of the arrows, FIG. 5 is a side view of the structure of FIG. 3 taken along line 5—5 in the direction of the arrows, and FIG. 6 is a perspective view of an alternative piezo-electrically tuned rod laser incorporating features of the present invention.

DESCRIPTION OF THE PREFERRED EMBODIMENTS

Referring now to FIGS. 1 and 2, there is shown a ring laser oscillator 11 incorporating features of the present invention. The ring laser oscillator 11 includes a crystal 12 of a lasant magneto-optic material, such as Nd:YAG, faceted for internal reflection of a beam of lasant radiation around a closed path 13 to define a ring optical resonator, more fully described below with regard to FIGS. 3–5.

The crystal 12 is disposed to receive a beam 14 of optical pumping radiation generated by a laser diode 15, such as a Model F4048, commercially available from Toshiba. The output beam 14 of the laser diode 15 is focused by a SELFOC gradient refractive index lens 16 onto an input-output face 17 of the crystal 12 The lens 16 is mounted to and carried from the window of the laser diode 15 by means of an optical cement.

A pair of permanent magnets 18 and 19 are positioned overlaying the crystal 12 and are polarized to produce a strong component of uni-directional magnetic field H as of 5 KG, in the crystal 12 and parallel to the direction of the optical beam 14 for producing the Faraday rotation effect in the crystal 12. Suitable magnets 18 and 19 are of Nd:iron:boron composition, commercially available as type Neigt No. 28 from I.G. Technology Corporation of Volpariso, Ind.

The laser diode 15 is carried from an L-shaped thermally conductive bracket 21, as of copper, which in-turn is supported from a baseplate structure 22, as of copper, via a thermal electric cooler 23. A thermistor 24 is mounted on the L-shaped bracket 21 for sensing the temperature of the laser diode 15.

The lasant crystal 12 is mounted to a major face of a thermally conductive block 25, as of copper, via the intermediary of an optical U.V. curing cement. The block 25 is mounted to a major face of a heater 26 via the intermediary of a relatively thick layer 27 of relatively low melting point solder. A suitable solder is a thermally fusable alloy 52% by weight indium and 48% by weight tin, having a melting point of 130° C., commercially available as Indalloy No. 1E from Indium Corporation of America, Utica, N.Y. In a typical example, the solder layer 27 has a thickness of 0.5 mm.

The heater is carried from a major face of a block 28 of thermally insulative material, such as fused silica, which in-turn is bonded to the baseplate 22 via the U.V. curing optical cement. U.V. optical cement also bonds the heater 26 to the block 28.

A cup-shaped cap 29 of a thermally conductive material, such as copper, is hermetically sealed over the baseplate 22. The cap 29 is held to the baseplate 22 by a plurality of screws 31 and the hermetic seal is made by means of a compressible O-ring 32, as of rubber, compressed between the lip of the cup 29 and the baseplate 22.

The baseplate 22 and the cap 29 define an evacuable enclosure 30 housing the ring laser 11. An electrical feedthrough 33 passes electrical conductors through the baseplate 22 into the enclosure for making electrical connections to the various electrical elements therein.

An optically transmissive window 34 is provided in the sidewall of the cup 29 through which the output optical beam 35 of the laser passes to the surrounds. The vacuum envelope 30 is evacuated and backfilled with dry nitrogen or, alternatively, maintained under vacuum, i.e., $1 \times 10^{-3}$ torr. The latter is preferred as it eliminates undesired convective heat exchange effects n either case, the optical faces are maintained free of contamination by the clean environment within the envelope 30.

Referring now to FIGS. 1–5, the piezo-electrically tuned 4 optical ring resonator 12 is shown in greater detail. A piezo-electric tuning element 41 is bonded, as by epoxy adhesive, to the upper free facet of the ring resonator crystal 12. The piezo-electric tuning element 41, in a preferred embodiment, comprises a square plate of piezo-electric material such as PZT-5H, commercially available from Vernitron Piezoelectric Division of Bedford, Ohio. In a typical example, the plate 41 has length and width dimensions of 0.2" respectively and has a thickness of 0.01". The piezo-electric element 41 is poled in the direction of the thin dimension. The two major faces of the plate (sheet) are plated with silver to provide electrodes for applying the tuning voltage across the thin dimension of the piezo-electric tuning plate 41.

The resonator crystal 12 is faceted to provide planar parallel top and bottom facets 42 and 43, respectively, with a front input facet 44 and two side facets 45 and 46 and an end facet 47. In a typical example, the slab of laser gain material 12 has a height of 2 mm, a length of 4.988 mm, a width of approximately 4.34 mm. The side and end facets 45, 46 and 47, respectively, are disposed and arranged for totally internally reflecting the optical beam 14 around in an enclosed path 13 without reflection from either top or bottom facets 42 and 43. A portion of the closed path 13 at 48 (see FIG. 5) is out of the plane of the remainder of the closed path 13 to define a non-planar ring resonator of the type disclosed in U.S. Pat. No. 4,578,793, issued 24 March 1986, the disclosure of which is hereby incorporated by reference in its entirety, and in an article appearing in "Optics Letters", Vol. 12, No. 3, of March 1987, pgs. 175–177. The magnetic field H applied by magnets 18 and 19, produces a Faraday rotation effect and intrinsic polarization causes the loss for oppositely travelling optical waves within the resonator to be substantially different, thereby supporting oscillation only in the low-loss direction around the ring 13. When end pumped, the ring oscillator 13 eliminates the effects of spatial hole-burning, is insensitive to optical feedback, and operates in a single axial mode.

Thin wire leads 49 and 51 are soldered to the two silver coated surfaces of the piezo-electric element 41 to permit the application of an electric field across the short dimension of the tuning element 41, i.e., in the direction of poling. This applied electric field causes the tuning element to attempt to increase or decrease its area if the applied electric field is parallel or anti-parallel with the direction of the poling. Since the piezo-electric element 41 is bonded to the rigid Nd:YAG resonator 12, it cannot contract as it would if it were free. Instead, it applies a field of shear forces to the Nd:YAG crystal. This field of forces is generally in the plane of the facet 42 to which the tuning element 41 is bonded. The applied force field F changes the index of refraction, the shape, and the size of the crystal 12 very slightly. These changes in the index of refraction, the shape and the size of the crystal produce a resultant change in the resonator optical length which results in a frequency change in the laser output at 35.

In a typical example, the change in frequency was 1.5 MHz per volt applied across the piezo-electric tuning element 41. The response time was less than 13 milliseconds. The resultant device is a voltage controlled optical oscillator.

In an alternative embodiment, as shown in FIG. 1, a second piezo-electric tuning element 52 is bonded to the bottom facet 43 of the crystal 12. Again, a tuning voltage is applied across the second tuning element 52 to produce a resultant change in the area of the tuning element 52 which change in area is translated as a tuning force through the facet 43 into the crystal for piezo-electrically tuning the optical resonator 12.

In still another embodiment, piezo-electric tuning elements 41 and 52 are bonded to both major faces 42 and 43 of the crystal 12, as previously described for tuning of the optical resonator 12. In the case where piezo-electric tuning elements are bonded to both major faces of the crystal 12, the voltages are applied to the piezo-electric elements 41 and 52 so that one of the tuning elements tends to increase its area whereas the opposite tuning element tends to decrease its area with the applied voltage.

Referring now to FIG. 6, there is shown an alternative embodiment of the present invention. In the embodiment of FIG. 6 the optical resonator is formed by a monolithic rod 54 of laser gain material such as Nd:YAG with mirrors 55 and 56 formed on opposite ends thereof to define a monolithic optical resonator therebetween The pumping beam 14 is introduced on the axis of the rod 54 for collinearly pumping the rod 54. A tuning facet 55 is formed along one side of the rod 54 and the piezo-electric tuning element 41 is bonded to the tuning facet 55 for transmitting the tuning force F through the tuning facet into the rod 54 for tuning the resonant frequency of the optical resonator and, thus, the output frequency of the laser. As in the embodiment of FIG. 1, the tuning elements 41 and 52 may be bonded to opposite facets of the rod 54.

The advantages of the piezo-electrically tuned optical resonator of the present invention, contrasted with the piezo-electric tuning clamp structure of the prior art, include: the speed of response of the system of the present invention is faster than that for the prior art clamp because it is much smaller. Response speed is determined by the speed of sound and by the dimensions of the system. The response cannot be faster than the time it takes sound to move from one end of the mechanical system to the other. In the present invention, the tuned system is much smaller than the prior art, consisting primarily of the Nd:YAG crystal 12 with its very high speed of sound which will respond faster than larger systems such as that of the clamp.

The sensitivity to acoustic noise of a laser depends on its size, also. Small objects with very large internal sound velocities are not much affected by acoustic noise. Larger and more complex shapes will resonate when driven by acoustic noise. Large acoustic responses due to resonances are responsible for much of the frequency instability of conventional lasers. In the present invention, the relatively small size of the structure allows the system to have low response to acoustic noise.

A further advantage of the piezo-electrically tuned resonator of the present invention is that it is more readily fabricated. A piece of piezo-electric material is simply bonded to a tuning facet of the monolithic resonator. This is in sharp contrast to the clamp-type design where the entire laser must be built around the relatively large clamp structure.

What is claimed is:

1. In a method for piezo-electrically tuning an optical resonator, the steps of:
applying a voltage across a piezo-electric element having an interface bonded to and overlaying at least a portion of a solid state member of an optical resonator such that the applied voltage tends to change the area of the bonded interface for transmitting a resultant field of forces into the overlaid portion of the solid state member of the optical resonator through the bonded interface for producing a stress-related change in the index of refraction and the dimensions of at least a portion of the optical resonator for tuning the frequency for an optical resonant mode of said optical resonator.

2. The method of claim 1 wherein the solid state member of the optical resonator is an optically transparent faceted member of solid state material with the facets disposed and arranged for reflecting optical wave energy therebetween within the faceted member to define a monolithic optical resonator tuned by the applied voltage.

3. The method of claim 2 including making the optical transparent faceted member of a laser gain material;
optically pumping the laser gain material to produce lasant transitions and emission of lasant radiation;
resonating the emitted lasant radiation within the monolithic optical resonator; and
coupling a portion of the resonated lasant radiation out of the monolithic optical resonator for providing a monolithic laser source of lasant radiation, the frequency of which is tunable in response to the amplitude of the applied voltage.

4. The method of claim 3 including the step of:
arranging and disposing the facets of the faceted member of solid state gain material for reflecting the optical wave energy therebetween and around in a closed path to define an optical ring laser tuned by the applied voltage.

5. The method of claim 4 including the step of:
arranging one of the facets of the faceted member of solid state laser gain material to be outof and generally overlaying the closed path of the resonated lasant radiation to define a tuning facet; and
bonding the piezo-electric element to the tuning facet through which the piezo-electrically produced tuning force fields are transmitted into the ring laser for frequency tuning same.

6. In a piezo-electrically tuned optical resonator:
optical resonator means for resonating optical wave energy therein and including a solid state optically transparent member for passing therethrough the resonated optical wave energy and said transparent member having a tuning facet for passing therethrough tuning forces for tuning the resonant frequency of the resonated optical wave energy; and
piezo-electric means including a piezo-electric member bonded in force-exchanging relation with said tuning facet of said optically transparent member of said optical resonator means and being responsive to a voltage applied across said piezo-electric member for transmitting resultant force vectors directed predominantly parallel to the surface of said tuning facet into said optically transparent member through said tuning facet for producing a stress-related change in the index of refraction and dimensional change of said optically transparent member for tuning the frequency of an optically resonant mode of said optical resonator means.

7. The optical resonator of claim 6 wherein said optically transparent member of said optical resonator means is faceted with said facets disposed and arranged for reflecting optical wave energy therebetween within said faceted member to define a monolithic optical resonator tuned by the voltage applied to said piezo-electric means.

8. The optical resonator of claim 7 wherein said facets are disposed and arranged for reflecting optical wave energy therebetween and around in a closed path within said faceted member to define a monolithic optical ring resonator.

9. The optical resonator of claim 7 wherein said member is made of a laser gain material;
   optical pumping means for optical pumping said laser gain material for producing lasant transitions and emission of lasant radiation for exciting a resonant optical mode of said optical resonator means; and
   output coupling means for coupling a portion of the resonated lasant radiation out of said monolithic optical resonator for providing a monolithic laser source of lasant radiation, the frequency of which is tunable in response to the amplitude of the voltage applied to said piezo-electric means.

10. The optical resonator of claim 9 wherein said facets are disposed and arranged for reflecting optical wave energy therebetween and around a closed path within said faceted member to define a monolithic optical ring resonator.

11. The optical resonator of claim 10 wherein said tuning facet of said faceted member of laser gain material is disposed out of and generally overlaying the closed path of the resonated lasant radiation; and
   said piezo-electric element being bonded to and overlaying said tuning facet.

12. The optical resonator of claim 10 including:
   magnet means for applying a magnetic field to said monolithic laser ring resonator for producing a Faraday rotation effect therein to preferentially attenuate resonated lasant optical radiation travelling in a direction counter to said output optical energy within said optical resonator.

13. In a ring laser:
   a faceted member of optically transparent lasant material;
   a plurality of said facets of said member of lasant material being disposed and oriented for reflecting optical energy internally to said member around in a non-planar closed ray path within said member to define an optical ring resonator;
   a coupler one of said internally reflecting facets serving to couple input and output optical energy into and out of said ring resonator along divergent input and output ray paths;
   a magnet for applying a magnetic field to said faceted member for producing a Faraday rotation effect therein to preferentially attenuate optical wave energy travelling within said resonator in a direction counter to that of the output optical energy;
   a source of optical pumping energy directing said pumping energy into said faceted member through said coupler facet and along said input ray path; and
   a sheet of piezo-electric material bonded to a tuning one of said facets of said faceted member for transmitting tuning force vectors predominantly directed in the plane of the surface of and through said tuning facet in response to an applied voltage for tuning the frequency of the output optical energy.

* * * * *